United States Patent [19]

Maldonado et al.

[11] Patent Number: 4,554,676

[45] Date of Patent: Nov. 19, 1985

[54] DENTAL AIMING DEVICE

[75] Inventors: Robert Maldonado, Santa Clara; Clark E. Loughry, San Jose, both of Calif.

[73] Assignee: The S. S. White Company, Holmdel, N.J.

[21] Appl. No.: 475,824

[22] Filed: Mar. 16, 1983

[51] Int. Cl.⁴ ............................................. A61B 6/14
[52] U.S. Cl. ................................... 378/170; 378/147
[58] Field of Search ............... 378/140, 145, 147–150, 378/167–170, 177, 205; 250/515.1

[56] References Cited

U.S. PATENT DOCUMENTS

| 3,092,721 | 6/1963 | Medwedeff | 378/170 |
| 3,304,422 | 2/1967 | Medwedeff | 378/168 |
| 3,304,423 | 2/1967 | Medwedeff | 378/168 |
| 3,469,099 | 9/1969 | Best | 378/168 |
| 3,745,344 | 7/1973 | Updegrave | 378/170 |
| 3,849,649 | 11/1974 | Carey | 378/150 |
| 4,048,506 | 9/1977 | Updegrave | 378/170 |
| 4,507,798 | 3/1985 | Welander | 378/170 |

Primary Examiner—Craig E. Church
Assistant Examiner—Charles Wieland
Attorney, Agent, or Firm—Seidel, Gonda, Goldhammer & Abbott

[57] ABSTRACT

Dental aiming device permits periapical and bitewing exposures of the entire dentition without subjecting the patient to unnecessary radiation.

12 Claims, 12 Drawing Figures

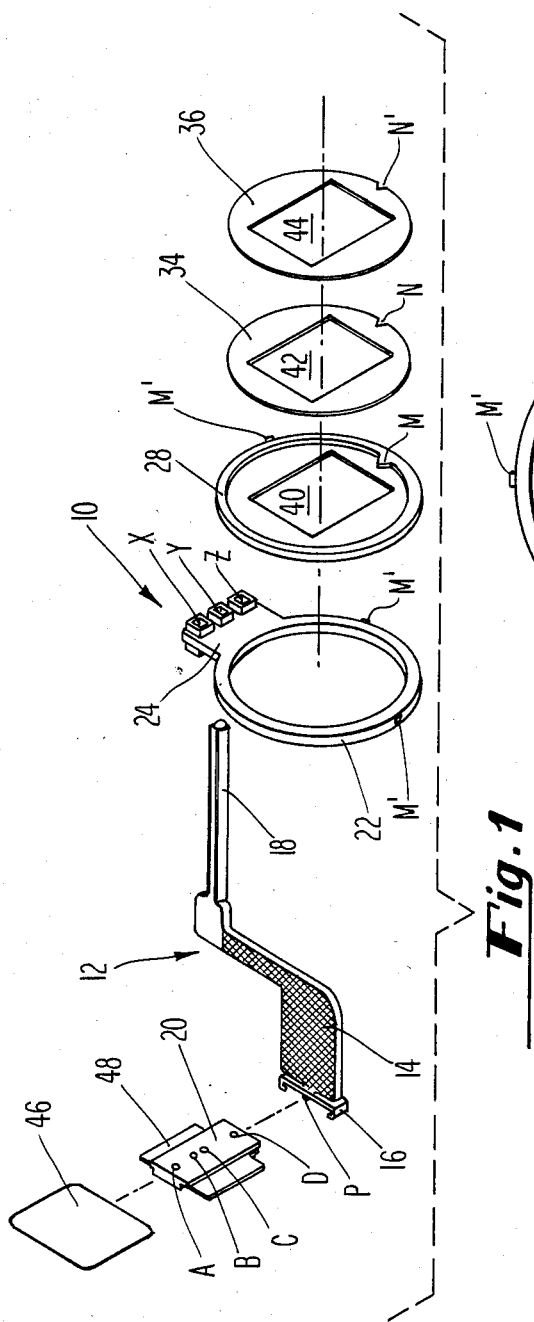
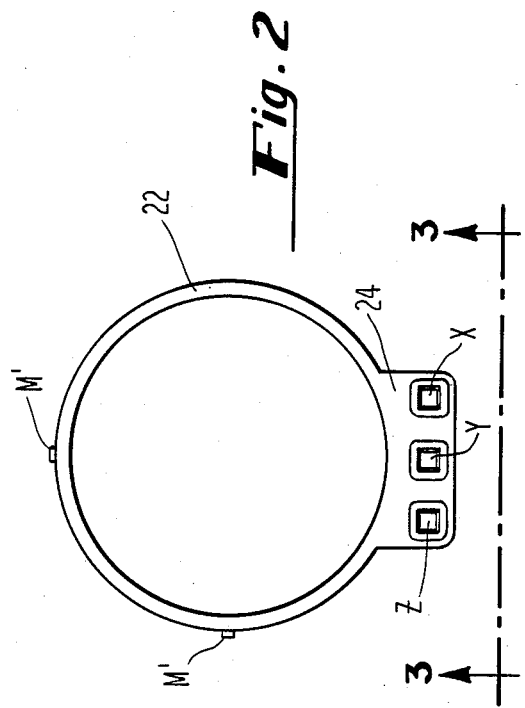
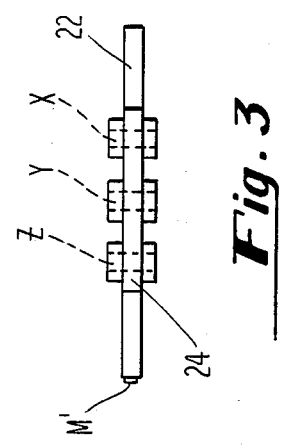
Fig. 1
Fig. 2
Fig. 3

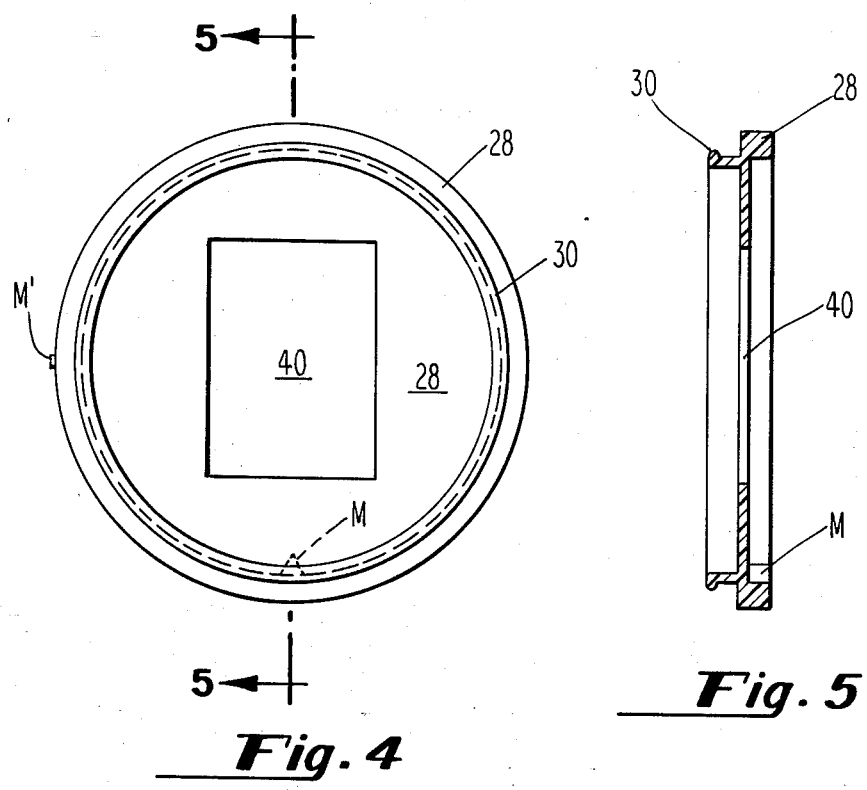
Fig. 4
Fig. 5
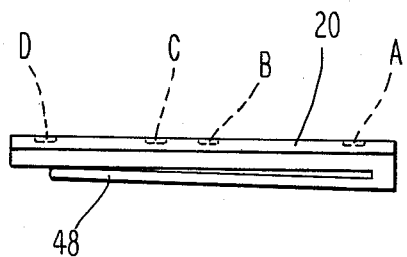
Fig. 6

DENTAL AIMING DEVICE

STATEMENT OF THE INVENTION

This invention relates to a dental aiming device for use with long beam paralleling techniques. The device substantially eliminates unnecessary x-ray exposure to the patient and is readily accomodative of periapical and bitewing exposures of the entire dentition.

BACKGROUND AND SUMMARY OF THE INVENTION

Intraoral dental radiography employs two widely used techniques, i.e., the bisecting angle technique and the paralleling technique. One of the advantages of the former resides in the use of a shorter focal distance which permits reduced exposure times to patients thereby lessening potential harm thereto. This advantage however is offset by greater image distortions.

Use of the present device eliminates practically all unnecessary x-ray exposure to the patient while yet providing the quality of images expected from practicing paralleling techniques.

The present invention employs an aligning member having film holding means at one end, an aligning arm at its other end, and a biteplate intermediate thereof. The aligning arm is frictionally received within one of 3 linearly disposed rectangular bores provided in a mount extending from a peripheral portion of an alignment ring.

Rotatably adjustably mounted to the alignment ring is an plate holder which carries an x-ray opaque plate or shield and a support or cover plate, the x-ray opaque plate being sandwiched thereinbetween. The plate holder, x-ray opaque plate, and cover plate are each provided with identical centrally disposed rectangular apertures maintained in alignment, which apertures may be disposed vertically or horizontally by merely rotating the plate holder in the alignment ring.

The film holding means slidably adjustably receives a film holder which resiliently adjustably grasps the x-ray film. By a simple re-arrangement of the various components, bitewing and periapical exposures of any region of the human dentition may readily be accommodated. The large diameter of the alignment ring is compatible with standard cones and is more easily and accurately aligned than aiming devices employing target points.

BRIEF DESCRIPTION OF THE DRAWINGS

FIG. 1 is an exploded perspective view of an embodiment of the aiming device of the present invention.

FIG. 2 is a front elevational view of the alignment ring shown in FIG. 1.

FIG. 3 is an end view of the alignment ring of FIG. 2 looking in the direction of arrows 3—3.

FIG. 4 is a front elevational view of the plate holder shown in FIG. 1.

FIG. 5 is a sectional view of the plate holder of FIG. 4 taken along line 5—5 thereof.

FIG. 6 is an elevational view of the film holder illustrated in FIG. 1.

DETAILED DESCRIPTION OF THE INVENTION

Figure 7:
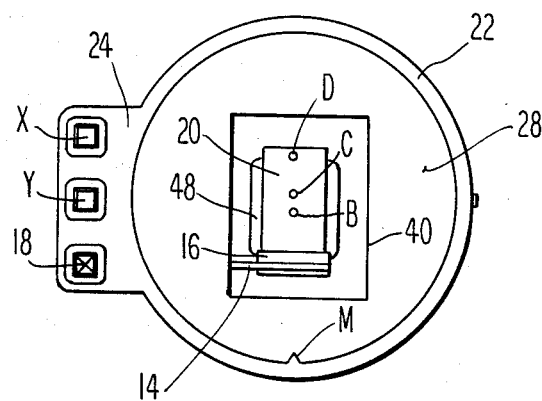
FIGS. 7-10 are perspective elevation views (looking in the direction of the patient from the x-ray source) showing relative positioning of several components of the present aiming device, without film, when obtaining various periapical exposures.

In FIG. 1, aiming device 10 comprises an aligning member 12 which includes biteplate 14, film holding means 16, and aligning arm 18, substantially rectangular in cross-section. Film holder 20 is slidably adjustable in film holding means 16. Film holder 20 is provided with 4 indentations, A, B, C and D, vertically aligned, which are capable of registering with a corresponding projection P on film holding means 16.

An alignment ring 22 (FIGS. 2 and 3) is frictionally slidably adjustable along aligning arm 18 when arm 18 is received in any one of 3 rectangular bores X, Y or Z, linearly disposed, provided in an extension or mount 24 integrally molded along a peripheral portion of the alignment ring. The rectangular configuration of arm 18 and bores X, Y and Z prevents rotational displacement between the aligning member 12 and alignment ring 22. The alignment ring 22 frictionally receives plate holder 28 by means of an annular lip 30, (FIGS. 4 and 5) provided therearound which permits plate holder 28 to frictionally rotate within alignment ring 22. A thin x-ray opaque apertured plate 34, suitably lead and about 0.020" to 0.030" thick, is preferably secured within plate holder 28 by means of projection M thereon engaging notch N provided in lead plate 34. Finally, a plate or cover plate 36 is adhered to lead plate 34, or plate 36 is provided with a similar notch N' for engaging projection M of plate holder 28 to thereby sandwich and support lead plate 34 to the plate holder.

Plate holder 28, lead plate 34, and aperture cover 36 have identical apertures 40, 42 and 44 provided centrally respectively therein, preferably rectangular in configuration and in alignment. To facilitate vertical and horizontal disposition of the apertures to thereby permit more reliable and reproducible bitewing and periapical images, notches, markings, engravings or raised projections M' may additionally optionally be provided on alignment ring 22 and plate holder 28. Of course, horizontal and vertical disposition of the apertures may be achieved by visual inspection.

Film 46 is maintained in fixed position within film holder 20 by means of resilient flap 48 (FIG. 6). Film holder 20 is configured as shown in FIG. 1 to enable it to frictionally slide completely through the film holding means 16 in either vertical position. Of course, mating of one of the indentations A, B, C or D in film holder 20 with the projection P on film holding means 16 will prevent slippage therebetween when disposed in the mouth of the patient.

The entire aiming device 10 may be molded or otherwise made from a suitable plastic material with the exception of x-ray opaque plate 34.

The present aiming device accepts periapical and bitewing dental x-ray film of standard size. If a periapical image of the upper left molars is desired, for example (FIG. 7), film 46 will be inserted into film holder 16. Resilient flap 48 maintains the film in fixed position. Arm 18 of the aiming arm 12 is inserted into bore Z of extension 24 of alignment ring 22, and indentation A of film holder 20 caused to register with projection P of film holding means 16. The film and film holder portion are then carefully positioned in the patient's mouth, which position is substantially maintained when the teeth of the patient is closed firmly on biteplate 14. The alignment ring 22 may be adjusted along arm 18 in accordance with the size of the nose of the patient prior to positioning the x-ray cone adjacent to and concentric with the alignment ring 22 and parallel to aligning arm 18.

Figure 8:
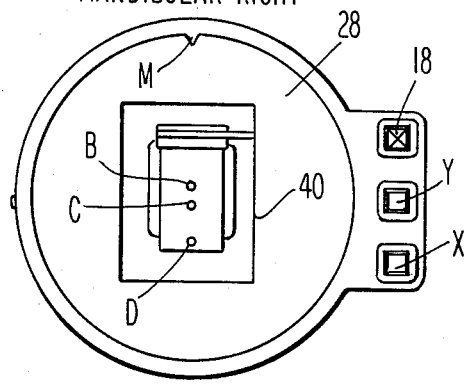

Rotation of the aiming device 180° will permit the right mandibular region to be periapically exposed (FIG. 8).

Figure 9:
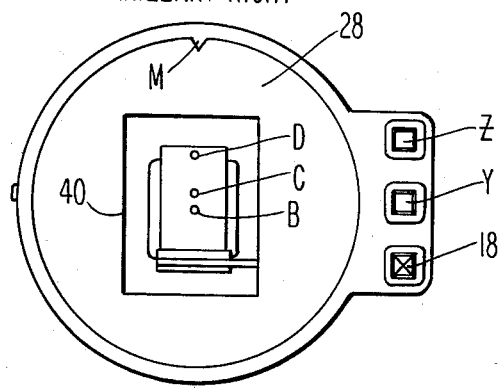
Figure 10:
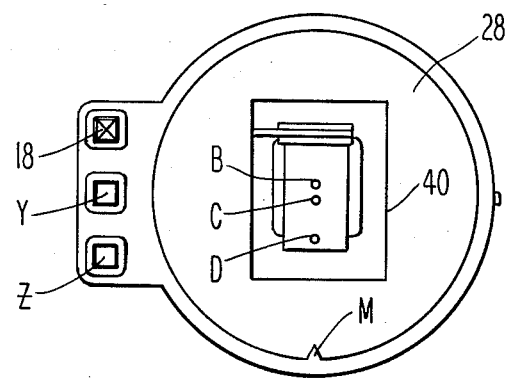

Similarly, FIGS. 9 and 10 illustrate relative positioning of components when periapical images are desired of the upper right and lower left regions respectively of the dentition.

Since film holder 20 is "hinged" (FIG. 6) to thereby limit the extent of insertion of film 46 thereinto, indentation A, in lieu of indentation D, may be caused to engage projection P to optimize various periapical exposures with various film sizes.

Figure 11:
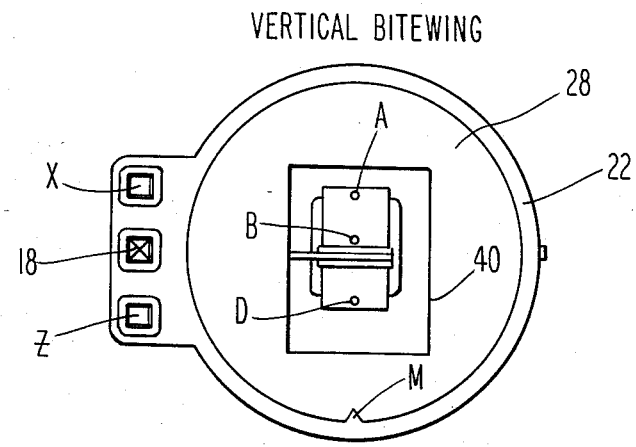
FIGS. 11 and 12 are perspective elevation views similar to FIGS. 7-10 relating to bitewing images.
Figure 12:
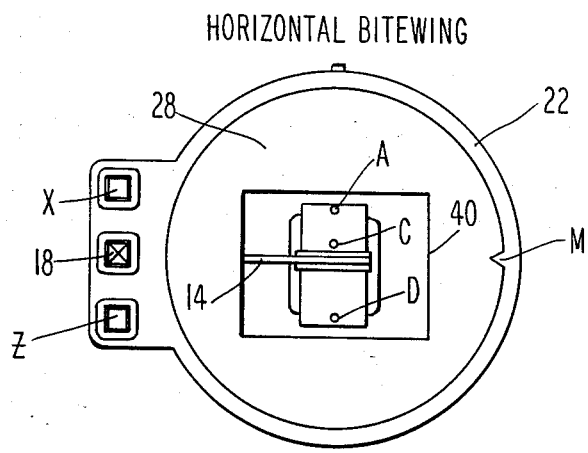

Vertical bitewing exposures may conveniently be taken when off-center identation C engages projection P (FIG. 11) and arm 18 is received within central bore Y.

Central bore Y retains arm 18 therein for horizontal bitewing exposures, but projection P now engages centrally disposed indentation B. Plate holder 28 will be rotated 90° in adjustment ring 22 with the aid of markings M and M' or by visual inspection.

Summarizing, by a simple re-arrangement, if necessary, of components of the present aiming device, any periapical or bitewing exposure of maxillary or mandibular posterior or anterior teeth is readily accommodated without subjecting the patient to unnecessary x-rays.

We claim:

1. A dental aiming device comprising:
    an alignment member having film holding means at one end and an aligning arm at its other end with a biteplate intermediate thereof, said arm being offset with respect to said film holding means and said bite plate;
    a film holder slideably adjustable in a vertical direction within said film holding means;
    an alignment ring adjustably mounted to said aligning arm for slidable movement thereon;
    a plate holder rotatably mounted to said alignment ring; and
    an x-ray opaque plate mounted to said plate holder, said plate holder and said x-ray opaque plate each having an aligned centrally disposed aperture therein of identical configuration.

2. Device of claim 1 further characterized by
    cover means mounted to said plate holder for supporting said x-ray opaque plate thereto, said cover means having a centrally disposed aperture of identical configuration as said apertures in said plate holder and said x-ray opaque plate and aligned therewith.

3. Device of claim 2 wherein said x-ray opaque plate is lead, and said plate holder and said cover means rigidly sandwich said lead plate therebetween.

4. Device of claim 1 wherein each of said apertures is rectangular in configuration.

5. Device of claim 1 wherein said alignment ring is provided with a mount extending from a peripheral portion thereof, said mount having a plurality of bores therethrough linearly aligned, one of said bores frictionally receiving said arm.

6. Device of claim 1 wherein each of said apertures is rotatable as a unit by rotation of said plate holder in said alignment ring.

7. Device of claim 1 wherein said film holder is provided with a plurality of vertically disposed preformed indentations and said film holding means is provided with a projection for engagement with any one of said indentations.

8. Device of claim 1 wherein said film holder includes a flap which resiliently grasps film, said film being vertically and horizontally adjustable in said film holder.

9. Device of claim 5 wherein each of said bores is rectangular in configuration.

10. Device of claim 9 wherein said film holder is provided with a plurality of indentations and said film holding means is provided with a projection for engagement with any one of said indentations.

11. Device of claim 10 wherein said aligning arm is received in a selected one of said bores, and said projection is engaged in a selected one of said indentations to thereby permit periapical exposures, vertical bitewing exposures and horizontal bitewing exposures of any region of a patient's dentition.

12. A dental aiming device comprising an alignment member having film holding means at one end and an aligning arm at its other end with a biteplate therebetween, said arm being offset with respect to said film holding means and said biteplate, a film holder slidably adjustable in a vertical direction within said film holding means, an alignment ring adjustably mounted to said arm for sliding movement therealong in a direction parallel to the axis of said ring, means for accommodating any periapical or bitewing exposure of maxilliary or mandibular posterior or anterior teeth without subjecting a patient to unnecessary x-rays, said means including a plate holder rotatably mounted to said alignment ring, and x-ray opaque plate mounted to said holder, said plate holder and plate each having an aligned centrally disposed aperture therein of identical rectangular configuration, said ring having a mount extending from a peripheral portion thereof, said mount having a plurality of bores therethrough and linearaly aligned, said bores being parallel to said axis with one of said bores receiving said arm.

* * * * *